Patented Aug. 6, 1929.

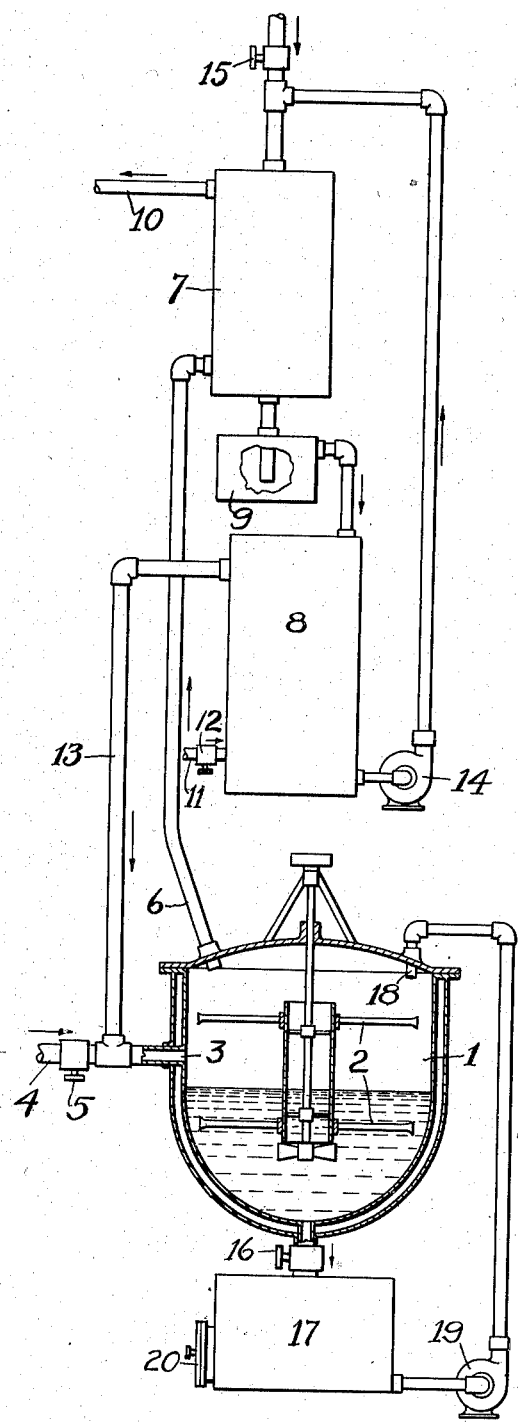

1,723,761

UNITED STATES PATENT OFFICE.

DONALD B. BRADNER, OF EDGEWOOD, MARYLAND, AND FRANK H. BEALL, OF NEWARK, NEW JERSEY.

PROCESS OF MAKING DINITROPHENOL.

Application filed May 29, 1923. Serial No. 642,175.

This invention relates to the manufacture of dinitrophenol, more particularly 2-4 dinitrophenol.

Dinitrophenol has been prepared heretofore by the reaction of nitric acid and benzol in the presence of mercury or mercuric salts. Such processes have proved unsatisfactory, due to the low rate of reaction, low yield, excessive formation of nitrobenzol or the occurrence of objectionable side reactions.

This invention has resulted in a process whereby it is possible to obtain consistently good yields, a rapid rate of reaction and a greatly reduced formation of objectionable by-products, such as nitrobenzol.

In carrying out this invention, we employ a substance, preferably acetic acid, which increases the solubility of the benzol in the reaction liquor, thereby greatly increasing the rate of reaction, and which is not consumed in the process, substantially all of this reagent being available for reuse. Other fatty acids, such as propionic and butyric acids, which increase the solubility of the benzol in the reaction liquor and are substantially unconsumed in the process, may be substituted, in whole or in part, for the acetic acid.

In carrying out this oxidation and nitration of the benzol, we have found it desirable to control the temperature of the reaction so that it will remain below 45° C., because the rate of formation of nitrobenzol increases with increase of temperature more rapidly than does the rate of formation of the dinitrophenol. As the temperature is decreased, using weak nitric acid of approximately 50%, the ratio of the by-product (nitrobenzol) to the main-product (dinitrophenol) decreases. However, the reaction slows down on decreasing the temperature, but this may be compensated for by increasing the volume of the bath. This results in a large increase in yield. The best operating temperatures are in the neighborhood of 25° C. when acetic acid is employed.

In the application by Donald B. Bradner, Ser. No. 465,016, filed Apr. 27, 1921, there is disclosed a process for maintaining the strength of the nitric acid during oxidation and nitration processes where nitric acid is employed, and we also use this method for controlling the strength of the nitric acid in the process involved in this invention. Briefly, this consists in introducing oxygen and nitrogen peroxide in suitable proportions to fortify the nitric acid and replenish that used up in the process. The nitrogen peroxide usually employed is about 20% in excess of the theoretical, whereas the oxygen used is about double the theoretical. For best results it is preferable to have nitric acid of 45 to 50%, although good results can be obtained with nitric acid as low as 40% or as high as 55%.

The quantity of acetic acid may be from 5 to 20% of the volume of the bath. We prefer to use an intermediate value of about 10%. The acetic acid which is added should not be too dilute, as this would affect the strength of the nitric acid in the reaction mass.

About 3 to 5% of the mercury catalyst, preferably in the form of a mercuric salt, is employed.

Reference is to be had to the accompanying drawing wherein we have illustrated, more or less diagrammatically, an apparatus for carrying out our process.

This apparatus comprises a reaction vessel 1, preferably jacketed, which is provided with a suitable stirrer or agitator 2. The benzol, nitrogen peroxide and oxygen enter the reaction vessel at 3, the fresh benzol and nitrogen peroxide being supplied through the pipe 4 regulated by the valve 5. The reaction within the vessel 1 takes place with the liberation of oxides of nitrogen, benzol, oxygen and small amounts of inert gases comprising nitrogen and $CO_2$, and these pass out of the reaction vessel 1 through the exit passage 6 and into a scrubber divided into towers 7 and 8, separated by a liquid seal 9. The towers 7 and 8 contain suitable acid-proof packing and the scrubbing liquid (nitrobenzol) in the tower 7 trickles down through the acid-proof packing and scrubs the exit gases, removing therefrom the soluble oxides of nitrogen and the benzol. The inert gases pass out through the waste pipe 10. The nitrobenzol seal 9 prevents the waste gases from the pipe 6 from passing out through the bottom of the tower 7.

Air, or preferably oxygen, is supplied, preferably under slight positive pressure, by a pipe 11 through the valve 12 and passing into the scrubbing tower 8 sweeps the $NO_2$ and benzol from the nitrobenzol liquid into the conduit or pipe 13 from which these gaseous substances pass into the reaction vessel 1 at 3.

A suitable circulating device such as the pump 14 serves to circulate the nitrobenzol through the scrubbing towers 7 and 8, the nitrobenzol being withdrawn at the bottom of the tower 8 and returnd to the top of the scrubbing tower 7. There is very little nitrobenzol used up in the scrubbing process. Additional quantities of the nitrobenzol may be supplied through the valve 15, as needed.

The process may be carried out continuously, the benzol, nitrogen peroxide and oxygen being fed to the liquor containing the mercury catalyst and acetic acid in the vessel 1. It is advisable to agitate the substances during the reaction in order to prevent the growth of large crystals of dinitrophenol and thereby avoid the formation of a solid cake which is difficult to handle, and we have provided the agitator or stirrer 2 for this purpose. Furthermore, agitation aids in regenerating nitric acid with oxygen and nitrogen peroxide. The reaction liquid is withdrawn from the reaction vessel 1 through the valve 16 into a suitable filtering device 17 wherein the crystallized dinitrophenol is separated from the liquid, and this liquid is returned to the top 18 of the vessel 1 by means of the circulating pump 19. A suitable door 20 may be provided for removing the dinitrophenol from the filter 17.

The reaction vessel 1 is made of a suitable material such as high silica iron, enamelware, stoneware, etc., that will withstand the action of $HNO_3$, mercury and the other substances employed in the reaction.

The temperature in the reaction vessel may be controlled by refrigeration. The nitrobenzol in the tower 8 is preferably maintained at a temperature about 30° C. higher than that in tower 7, and thus helps the current of oxygen to sweep the nitrogen peroxide and benzol from the nitrobenzol. The dinitrophenol which is withdrawn from the filter chamber 17 is freed of nitrobenzol and other by-products by washing with a suitable substance, such as benzol. The purified product possesses a beautiful yellow color and melts at about 114° C.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

We claim as our invention:

1. In a process of making dinitrophenol by the reaction of nitric acid and benzol with the aid of a mercury catalyst, agitating the reacting mass and carrying out the reaction in the presence of a fatty acid which considerably increases the solubility of the benzol in the nitric acid, accelerates the reaction and is not consumed in the reaction.

2. In a process of making dinitrophenol by the reaction of nitric acid and benzol with the aid of a mercury catalyst, carrying out the reaction in the presence of acetic acid.

3. In a process of making dinitrophenol by the reaction of nitric acid and benzol with the aid of a mercury catalyst carrying out the reaction at a temperature of approximately 25° C. and in the presence of a fatty acid which considerably increases the solubility of the benzol in the nitric acid, accelerates the reaction and is not consumed in the reaction.

4. In a process of making dinitrophenol by the reaction of nitric acid and benzol with the aid of a mercury catalyst, carrying out the reaction at a temperature of approximately 25° C. and in the presence of acetic acid.

5. In a process of making dinitrophenol by the reaction of nitric acid and benzol with the aid of a mercury catalyst, carrying out the reaction at a temperature below 45° C., with nitric acid of approximately 50% strength and in the presence of a fatty acid which considerably increases the solubility of the benzol in the nitric acid, accelerates the reaction and is not consumed in the reaction.

6. In a process of making dinitrophenol by the reaction of nitric acid and benzol with the aid of a mercury catalyst, carrying out the reaction at a temperature of approximately 25° C., with nitric acid of approximately 50% strength and in the presence of acetic acid.

7. In a process of making dinitrophenol by the reaction of nitric acid and benzol with the aid of a mercury catalyst, absorbing the benzol and oxides of nitrogen evolved from the reaction vessel, with a high boiling solvent for benzene and nitrogen peroxide; blowing the absorbed benzol and oxides of nitrogen from the absorbent liquor and then returning the evolved gaseous substances to the reaction vessel.

8. In a process of making dinitrophenol by the reaction of nitric acid and benzol with the aid of a mercury catalyst, carrying out the reaction at a temperature of approximately 25° C. and in the presence of a fatty acid which considerably increases the solubility of the benzol in the nitric acid, accelerates the reaction and is not consumed in the reaction, scrubbing with nitrobenzol the benzol and oxides of nitrogen evolved from the reaction vessel, blowing the absorbed benzol and oxides of nitrogen from the nitro-benzol by means of oxygen, and then returning the evolved gaseous substances to the reaction vessel.

9. In a process of making dinitrophenol by the reaction of nitric acid and benzol with the aid of a mercury catalyst, agitating the reacting mass and carrying out the reaction at a temperature of approximately 25° C. and in the presence of a fatty acid which considerably increases the solubility of the benzol in the nitric acid, accelerates the reaction and is not consumed in the reaction, maintaining the strength of the nitric acid necessary for the oxidation and nitration of the benzol by the introduction of oxygen and nitrogen peroxide into the reaction liquor, scrubbing with nitrobenzol the benzol and oxides of nitrogen evolved from the reaction vessel, blowing the absorbed benzol and oxides of nitrogen from the nitro benzol by means of oxygen and then returning the evolved gaseous substances to the reaction vessel.

10. In a process of making dinitrophenol by the reaction of nitric acid and benzol with the aid of a mercury catalyst, carrying out the reaction at a temperature of approximately 25° C. and with nitric acid of approximately 50% strength, absorbing with nitrobenzol the benzol and oxides of nitrogen evolved from the reaction vessel, blowing the absorbed benzol and oxides of nitrogen from the nitro benzol by means of oxygen and then returning the evolved gaseous substances to the reaction vessel.

11. In a process of making dinitrophenol by the reaction of nitric acid and benzol with the aid of a mercury catalyst, carrying out the reaction at a temperature of approximately 25° C., with nitric acid of approximately 50% strength and in the presence of acetic acid, absorbing with nitrobenzol the benzol and oxides of nitrogen evolved from the reaction vessel, blowing the absorbed benzol and oxides of nitrogen from the nitro-benzol by means of oxygen and then returning the evolved gaseous substances to the reaction vessel.

12. In a process of making dinitrophenol by the reaction of nitric acid and benzol with the aid of a mercury catalyst, absorbing the benzol and oxides of nitrogen evolved from the reaction vessel with a high boiling solvent for benzene and nitrogen peroxide, heating the liquid carrying the absorbed benzol and oxides of nitrogen, blowing the absorbed benzol and oxides of nitrogen from the absorbent liquor and then returning the evolved gaseous substances to the reaction vessel.

13. In a process of making dinitrophenol by the reaction of nitric acid and benzol with the aid of a mercury catalyst, absorbing in nitrobenzol the benzol and oxides of nitrogen evolved from the reaction vessel, blowing the absorbent benzol and oxides of nitrogen from the nitro-benzol by means of oxygen and then returning the evolved gaseous substances to the reaction vessel.

DONALD B. BRADNER.
FRANK H. BEALL.